(12) United States Patent
Lock (10) Patent No.: US 6,349,165 B1
(45) Date of Patent: Feb. 19, 2002

(54) METHODS AND APPARATUS FOR CYLINDRICAL PACKAGING OF FIBER GRATINGS TO PROVIDE TEMPERATURE COMPENSATION

(75) Inventor: William E. Lock, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/460,213

(22) Filed: Dec. 13, 1999

(51) Int. Cl.[7] .................................................. G02B 6/00
(52) U.S. Cl. ......................... 385/136; 385/37; 385/127
(58) Field of Search ........................ 385/37, 123, 127, 385/128, 136, 137

(56) References Cited

U.S. PATENT DOCUMENTS 5,177,806 A * 1/1993 Abbott et al. .................. 385/76
5,552,092 A    9/1996 Francis et al.
5,926,599 A * 7/1999 Bookbinder et al. ........ 385/137
5,999,671 A * 12/1999 Jin et al. ....................... 385/37
6,067,392 A * 5/2000 Wakami et al. ................ 385/37

* cited by examiner

Primary Examiner—Cassandra Spyrou
Assistant Examiner—Euncha Cherry
(74) Attorney, Agent, or Firm—Mary Y. Redman (57) ABSTRACT

Passive temperature compensated packages for short-period fiber gratings and other optical components and techniques for forming the packages are described. In one aspect, a hollow tube having a negative coefficient of thermal expansion (CTE) encased in a cylindrical body is employed to form an athermalized cylindrical package. The hollow tube may also include slots for writing a grating onto an optical fiber disposed within the tube. In another aspect, end caps may be disposed on opposite ends of the cylindrical body.

10 Claims, 8 Drawing Sheets

METHODS AND APPARATUS FOR CYLINDRICAL PACKAGING OF FIBER GRATINGS TO PROVIDE TEMPERATURE COMPENSATION

FIELD OF THE INVENTION

The present invention relates generally to packaging of fiber optic components. More specifically, the present invention relates to methods and apparatus for packaging fiber gratings, filters, and other fiber optic components to provide a variety of improved features, such as athermalization, support, or protection.

BACKGROUND OF THE INVENTION

A periodic variation in refractive index of the waveguide along the long axis of the waveguide is commonly known as an optical waveguide grating. A fiber Bragg grating is an optical waveguide grating in a waveguide fiber which will selectively filter propagated light having a wavelength which is twice the period of the grating. Such a fiber Bragg grating is useful as a wavelength filter.

Fiber Bragg gratings are particularly sensitive to temperature changes which, through thermal expansion of the waveguide fiber, cause changes in the refractive index of the waveguide fiber. Changes in grating spacing and changes in the refractive index with temperature variations cause wavelength shifts in the device.

For many applications, fiber gratings must operate over large temperature ranges with minimal change in spectral properties. While the peak loss of the grating will change with temperature, the primary effect of a temperature change is a shift in peak wavelength. This temperature dependence can be compensated for by attaching the fiber grating to a substrate with a negative coefficient of thermal expansion. In one approach, fiber gratings are athermalized, or temperature compensated, by attaching them to a small bar of β eucryptite, a ceramic substrate with a negative coefficient of thermal expansion (CTE). A frit of at least two compositions attaches the optical fiber to the substrate and an epoxy deposit provides strain relief. The fiber grating attached to the substrate is then typically embedded in a protective fluorogel coating and enclosed in an hermetically sealed metal box to provide protection from the effects of humidity. This design depends upon integral bonding of the frit to a flat surface with a mismatched CTE. Stresses are created at the interface between the flat surface and the frit. This design is asymmetrical, leading to asymmetric forces acting on the optical fiber during thermal cycling. The manufacture of this package involves a large number of process steps and involves a labor intensive process.

Accordingly, it would be highly advantageous to provide a passive temperature compensating package assembly for fiber gratings which provides symmetrical packaging, ease of manufacturing, increased reliability, or a single frit composition.

SUMMARY OF THE INVENTION

The present invention provides advantageous methods and apparatus for packaging fiber gratings and other fiber optic components to provide a variety of improved features, such as athermalization, support, or protection. According to one aspect of the invention, a hollow tube having a negative CTE is employed to form an athermalized hollow tube package. The hollow tube surrounds an optical fiber containing a fiber grating, and is contained within a cylindrical body with end caps.

According to another aspect of the invention, a slotted hollow tube having a negative CTE with a longitudinal slot is employed to form an athermalized slotted hollow tube package. The slotted hollow tube surrounds an optical fiber containing a fiber grating, and is contained within a cylindrical body with end caps. The slotted hollow tube allows the fiber grating to be written in the optical fiber after the optical fiber is placed within the slotted hollow tube.

According to another aspect of the invention, the end caps fit within the ends of the cylindrical body.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several currently preferred embodiments of the invention are shown. However, this invention may be embodied in various forms and should not be construed as limited to the exemplary embodiments set forth herein. Rather, these representative embodiments are described in detail so that this disclosure will be thorough and complete, and will fully convey the scope, structure, operation, functionality, and potential of applicability of the invention to those skilled in the art.

As described in detail below, the present invention provides advantageous methods and apparatus for the cylindrical packaging of fiber gratings written into an optical fiber. Improved athermalization, support, or protection are provided as described below. In the embodiments of present invention described below, one or more seals are utilized with the packages of the present invention. According to one aspect of the present invention, the seals may include SnO—ZnO—$P_2O_5$ or PbO—SnO—$P_2O_5$ glass with pyrophosphate filler as described in U.S. Pat. No. 5,721,802 entitled "Optical Device and Fusion Seal" which is incorporated by reference herein in its entirety. According to another aspect of the present invention, the seals may be frits such as copper glass. According to another aspect of the present invention, the seals may be formed of amalgam or epoxy.

Additionally, in the embodiments of the present invention described below, one or more plugs are utilized with the packages of the present invention. According to one aspect of the present invention, the plugs may be fabricated of lead-tin solder or indium-tin solder. According to another aspect of the present invention, the plugs may include epoxy. Suitable epoxies are described in greater detail in U.S. Pat. No. 5,552,092 entitled "Waveguide Coupler" which is incorporated by reference herein in its entirety. According to another aspect of the invention, the plugs are composed of a low water-permeability polymer or amalgum.

Figure 1:
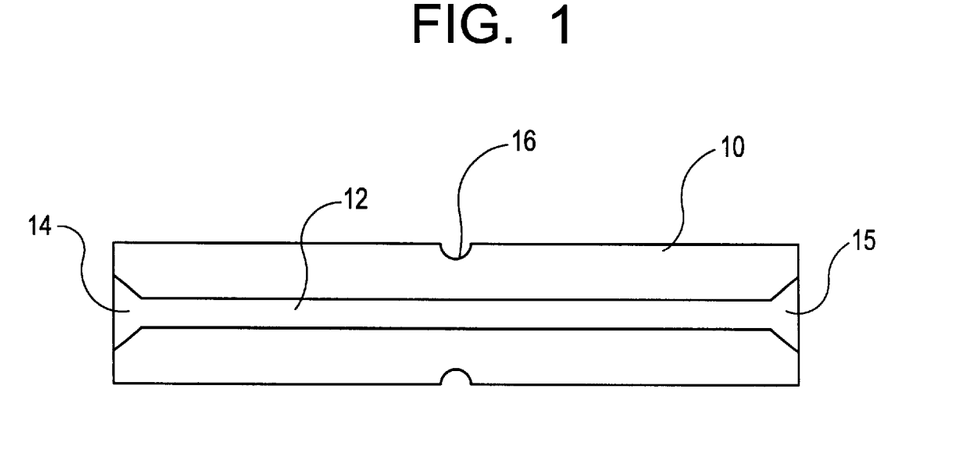
FIG. 1 is a cross-sectional view of a cylindrical substrate in accordance with the present invention.

Referring to the drawings, FIG. 1 shows a cross-sectional view of a cylindrical substrate 10 in accordance with the present invention. The substrate 10 is composed of β eucryptite, zirconium tungstate, phosphotungstate or some other suitable material with a negative coefficient of thermal expansion (CTE). Other suitable materials are disclosed in U.S. patent application Ser. No. 09/305,763 filed May 5, 1999 entitled "Negative Thermal Expansion Materials Including Methods of Preparation and Uses Therefor" which is incorporated by reference herein in its entirety. The substrate 10 includes a central bore 12 and a pair of seal sockets 14, 15 disposed at the ends of the central bore 12. The seal sockets 14, 15 may be conical, cylindrical or other suitable shape. A mid-span perimeter groove 16 encircles the substrate 10.

Figure 2:
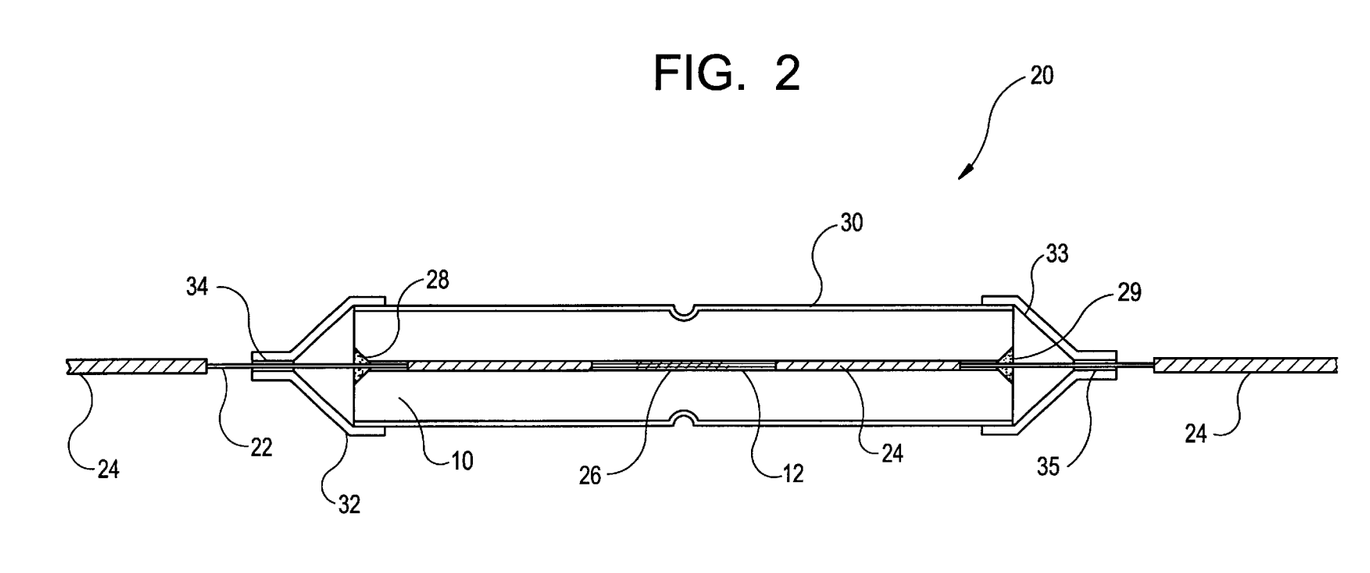
FIG. 2 is a cross-sectional view of an athermalized cylindrical package in accordance with the present invention.

FIG. 2 shows an athermalized cylindrical package 20 in accordance with the present invention. The cylindrical substrate 10 partially encloses an optical fiber 22 which includes a coating 24 which has been stripped from portions of the optical fiber 22. The optical fiber 22 has written into it a short-period grating 26 along a portion of a center length of the optical fiber which has been stripped of the coating 24. Two seals 28, 29 disposed one in each seal socket 14, 15 of the cylindrical substrate 10 tensionally maintain and support the region of the optical fiber 22 containing the fiber grating 26. The seals 28, 29 may include SnO—ZnO—$P_2O_5$ glass with pyrophosphate filler or other suitable material, as described above. The substrate 10 is enclosed by a cylindrical body 30 and two end caps 32, 33. The body 30 and end caps 32, 33 may include metal (such as nickel, stainless steel or Kovar®) glass, ceramic, polymer, or some other suitable material. The optical fiber 22 extends through each end cap 32, 33 and is held and sealed by plugs 34, 35. The plugs 34, 35 are composed of solder or other suitable material as described above. The cylindrical body 30 has been crimped along the mid-span perimeter groove 16 of the substrate 10. By allowing for central attachment to the cylindrical body 30, the mid-span perimeter groove 16 allows for symmetrical substrate shrinkage and growth in both directions with changes in temperature.

Figure 3:
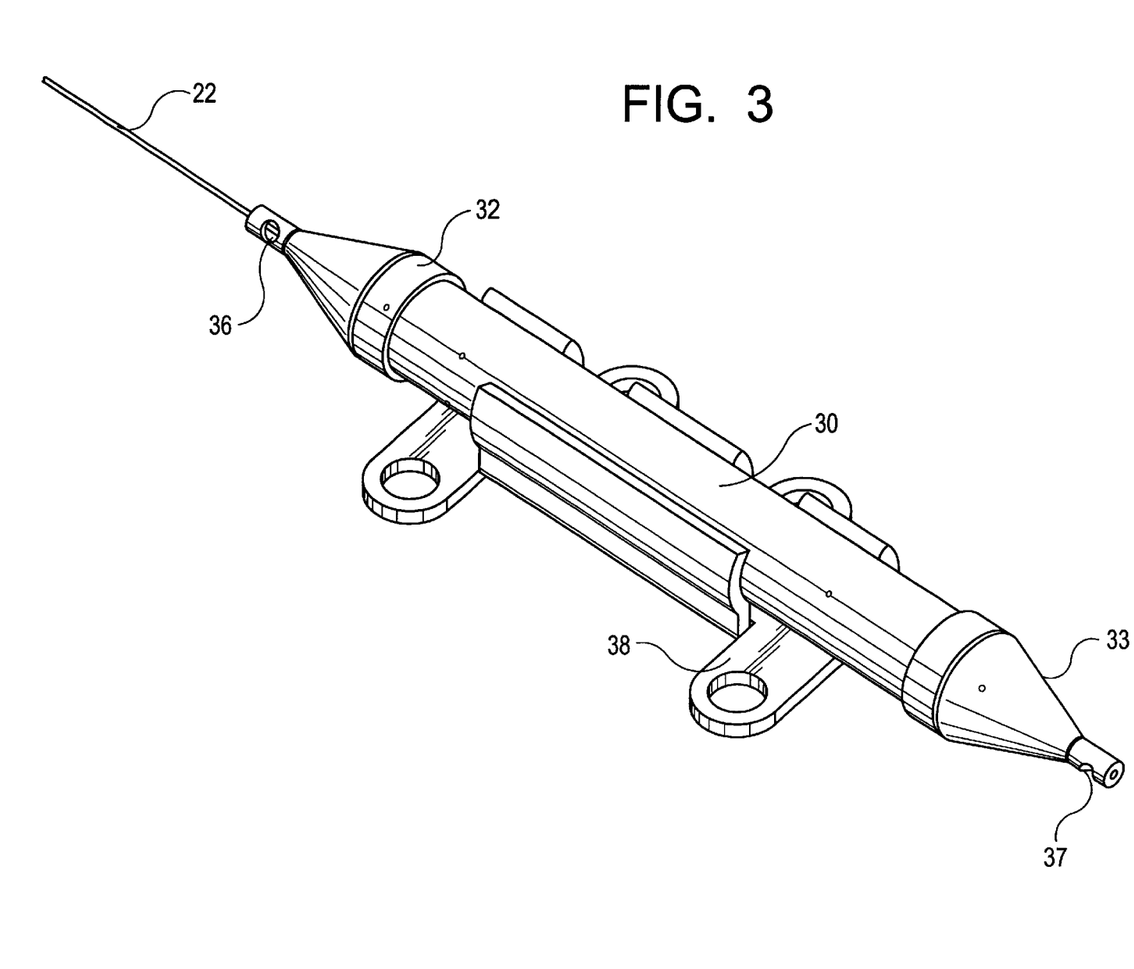
FIG. 3 is an isometric view of the athermalized hollow tube package of FIG. 2.

As best seen in FIG. 3, end caps 32, 33 include plug access holes 36, 37 to facilitate placement of the plugs 34, 35. To provide for attachment to a mounting surface, a clip base 38 is attached to the body 30.

In order to compensate for the temperatures changes that the cylindrical package 20 undergoes during testing and product life, the cylindrical substrate 10 has a negative CTE, such as $-80 \times 10^{-7}$ per ° C. Thus, while the optical fiber 22 has a CTE of approximately $7 \times 10^{-7}$ per ° C., the negative CTE of the cylindrical substrate athermalizes the fiber grating 26, providing passive temperature compensation. Additionally, the cylindrical substrate 10 protects the fiber grating 26 from external perturbations (such as mechanical stress) and environmental conditions (such as moisture). While presently preferred materials are disclosed herein, one skilled in the art would appreciate that the cylindrical package 20 of the present invention may include a variety of materials and sizes, and should not be construed as limited to the embodiments shown and described herein which are exemplary.

Figure 4:
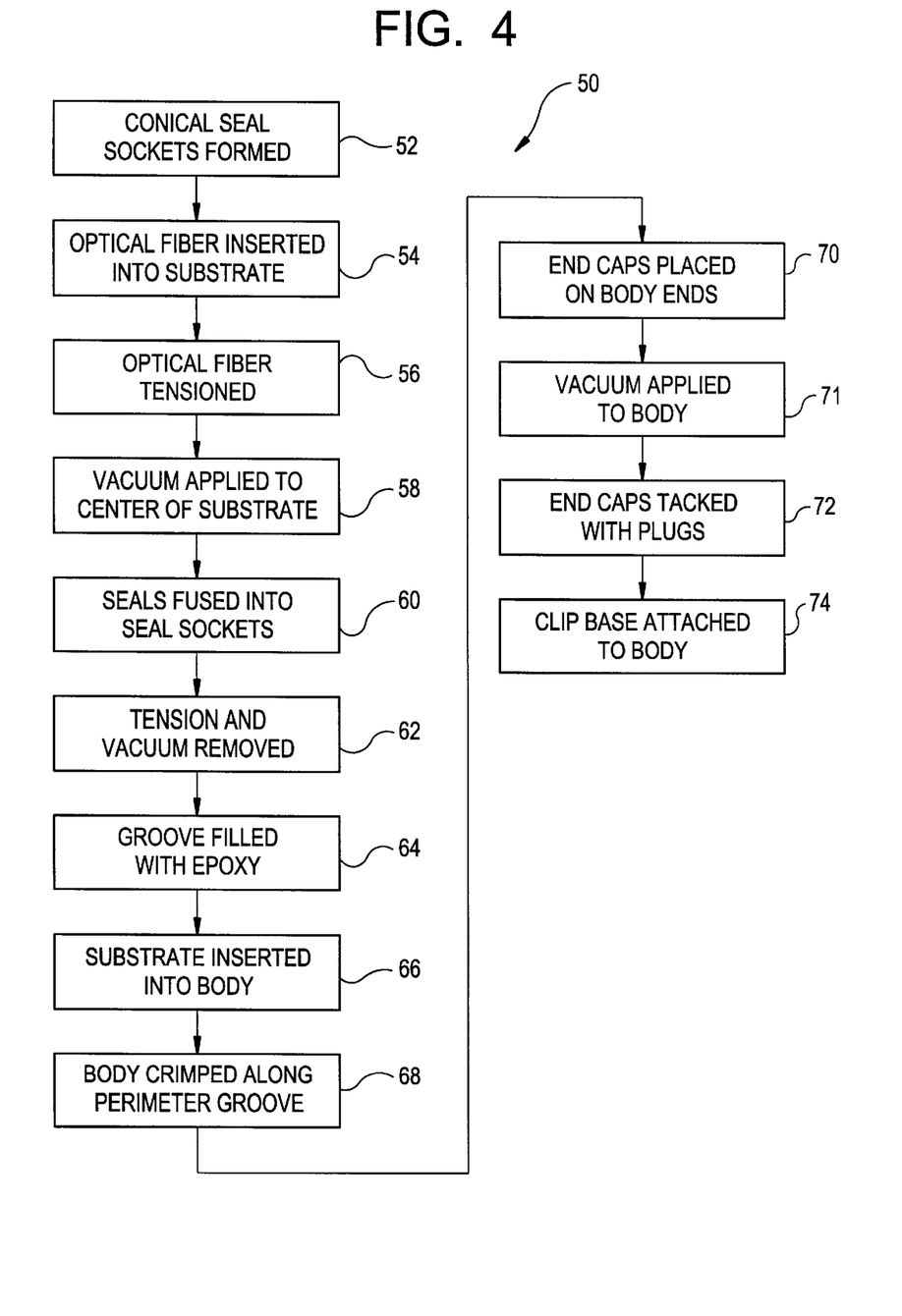
FIG. 4 is a flowchart of a method of forming the athermalized hollow tube package of FIG. 2 in accordance with the present invention.

FIG. 4 shows a method 50 of forming a cylindrical package (such as the cylindrical package 20). In a first step 52, seal sockets (such as the seal sockets 14) are formed in a cylindrical substrate (such as the cylindrical substrate 10). In a preferred embodiment, the seal sockets are formed by machining or grinding. In an alternative embodiment, the cylindrical substrate is mounted in a vertical orientation and nitrogen triflouride ($NF_3$) gas is forced through a center bore of the cylindrical substrate. The cylindrical substrate is then rotated, and an angled oxygen and gas torch burns the $NF_3$, forming the seal socket. The oxygen and hydrogen gas torch is mounted at a 45° angle with respect to an outer surface of the cylindrical substrate.

In a placement step 54, a waveguide such as, for example, an optical fiber, containing a fiber grating is placed within the cylindrical substrate. During insertion, the coating of the optical fiber acts as a guide for the uncoated section of optical fiber containing the grating, preventing the uncoated section from contacting the inner wall of the cylindrical substrate. Additionally, the conical seal socket guides the coated fiber into the substrate.

Next, in a tensioning step 56, the optical fiber is tensioned by a 5 gram weight. A vacuum is applied to the enter bore of the cylindrical substrate in step 58 with maximum vacuum of about 25 inches of $H_2O$. Alternatively, a dry inert gas, such as $N_2$, is applied to the center bore. In a next fusing step 60, a seal (such as the seal 20 described above) is fused to each seal socket by a laser system, ring burner or other focused heating system. Due to the heat sensitivity of the grating, the tube should be of sufficient length to assure that the grating is not affected by heat from the heating system. In step 62, the vacuum and tension are removed.

In a step 64, the mid-span perimeter groove is filled with epoxy. Next, in an insertion step 66, the cylindrical substrate is inserted into a body (such as the body 30). In a crimping step 68, the body is crimped into the epoxy along the mid-span perimeter groove. The epoxy is then cured.

In an assembly step 70, end caps (such as the end caps 32, 33) are placed on the ends of the body. The end caps are then welded or mechanically crimped to the package body. In a n alternative embodiment, the end caps are attached to the body by epoxy, solder, or another suitable material. Alternatively, the end caps may be shrink fit attached to the body by heating the end caps, placing the heated end caps on the body, and allowing the end caps to cool and contract. Alternatively, the end caps may be formed by swaging the ends of the body. In a step 71, a vacuum or a dry inert gas, such as $N_2$, is applied to the body. In a tacking step 72 the ends of the end cap are tacked with plugs (such as the epoxy plugs 34, 35 described above) to provide stress relief and hermiticity for the optical fiber. Each epoxy plug is applied manually into a plug access hole (such as the plug access hole 36, 37) with a small syringe and is then thermally cured. Nominal post cure time is approximately 1.5 hr. at 125° C., or approximately 16 hr. at 90° C. In step 74, a clip base (such as clip base 38) is clipped to the body. In an alternative embodiment, the base can be attached to the body by welding.

Figure 5:
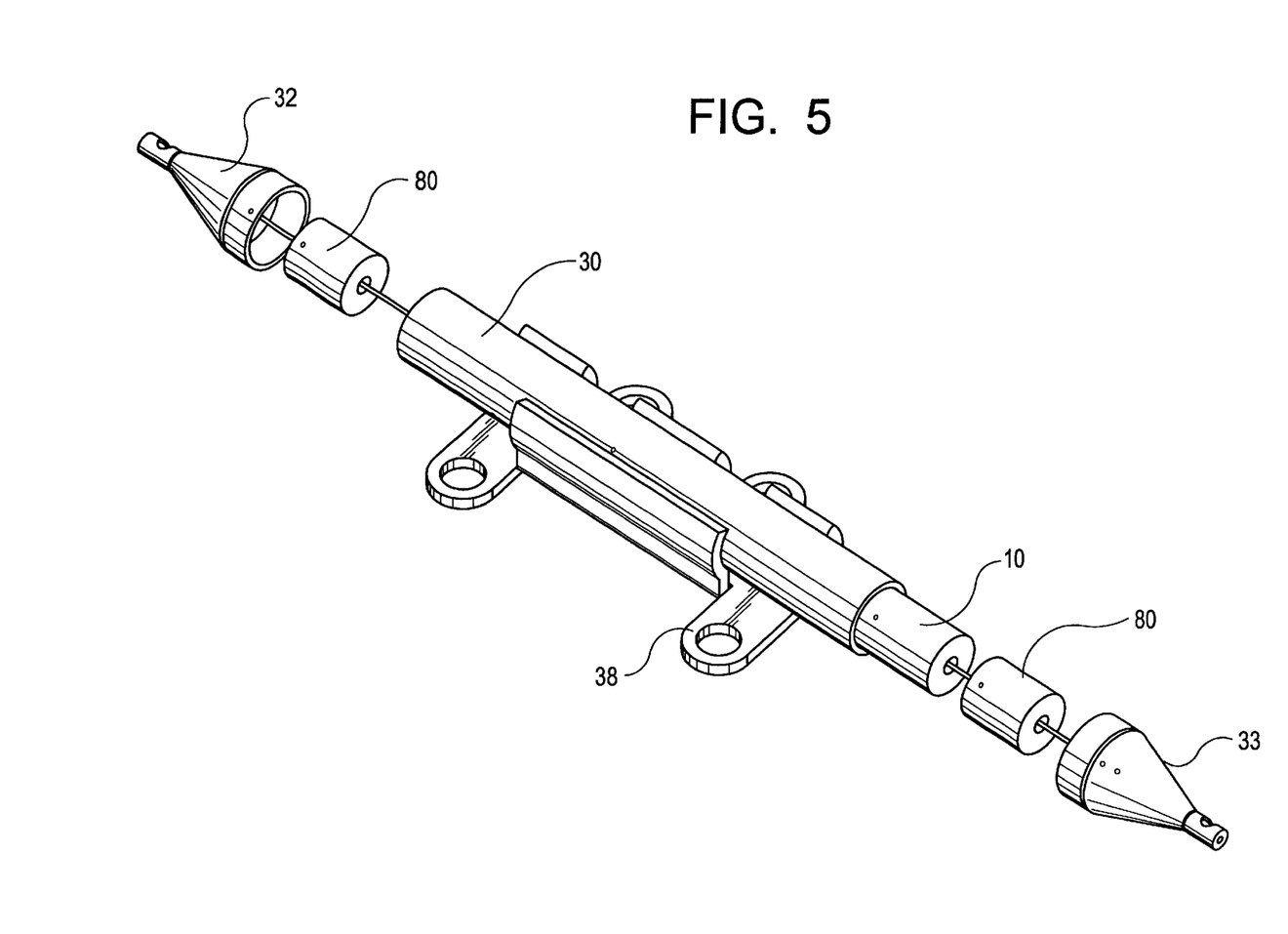
FIG. 5 is an exploded isometric view of the athermalized hollow tube package of FIG. 2 with foam positioning plugs.

According to another aspect of the present invention, as shown in FIG. 5, foam positioning plugs 80 may be utilized to provide support for the optical fiber 22 within the end caps 32,33.

Figure 6A:
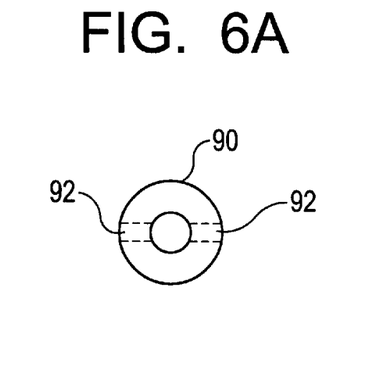
FIGS. 6A and 6B show an end view and a side view, respectively, of a slotted substrate in accordance with the present invention.
Figure 6B:
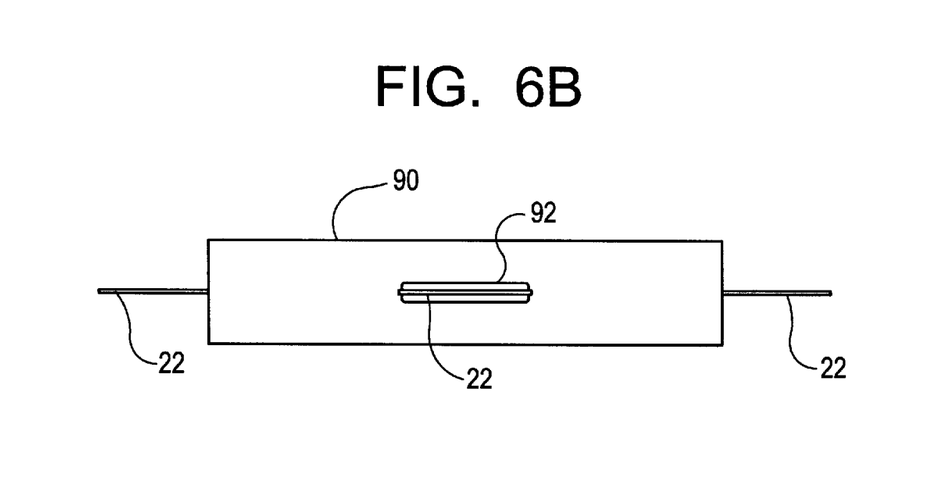

Another embodiment of the present invention is shown in FIGS. 6A and 6B which depict a slotted cylindrical substrate 90 for use with the athermalized cylindrical package 20 described above. The slotted cylindrical substrate 90 includes two slots 92 and otherwise conforms to the description of cylindrical substrate 10. The slots 92 are positioned on opposing sides of the substrate 10 and allow the optical fiber 22 to be positioned inside the substrate 10 prior to the grating 26 being written into the optical fiber 22.

Figure 7:
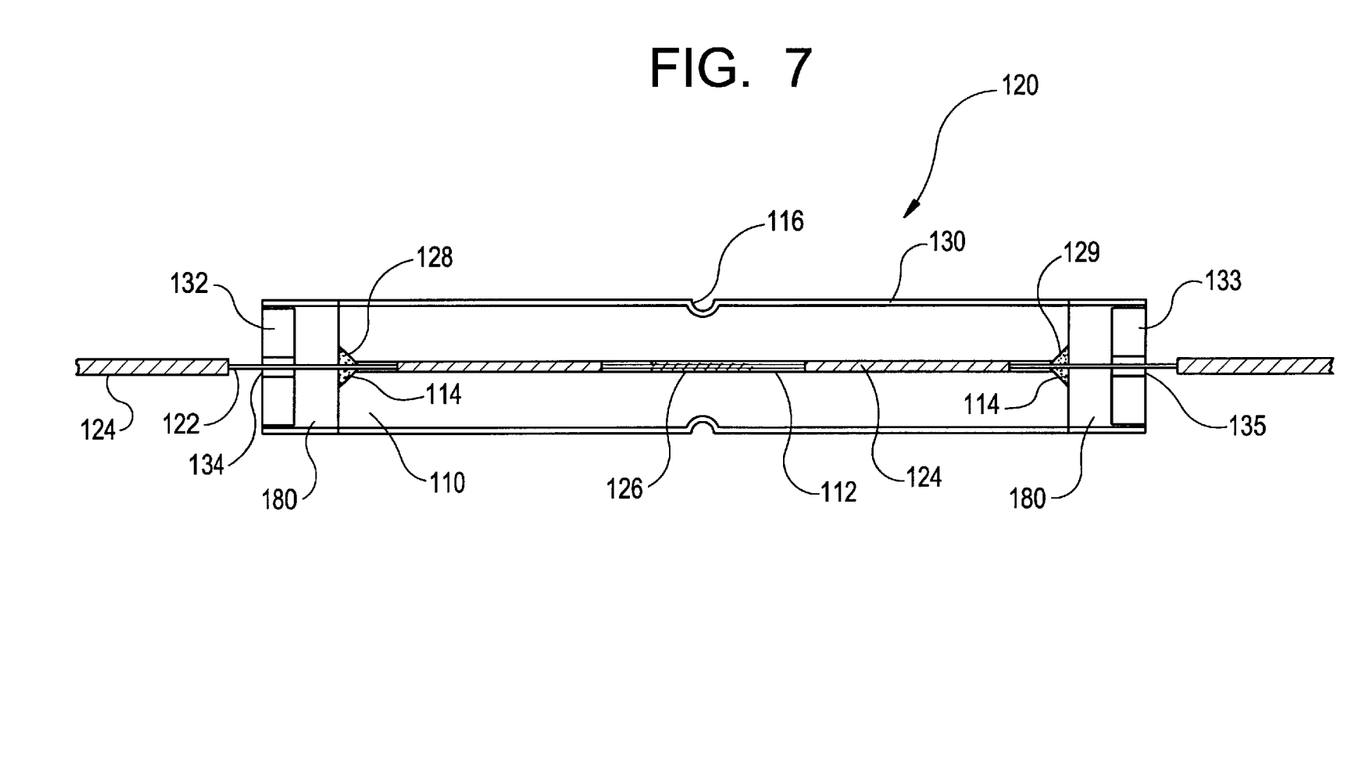
FIG. 7 is a cross-sectional view of an end cap with a plug in accordance with the present invention.

FIG. 7 shows an athermalized cylindrical package 120 in accordance with another embodiment of the present invention. In the package 120, a cylindrical substrate 110 partially encloses an optical fiber 122 which includes a coating 124 which has been stripped from portions of the optical fiber 122. The optical fiber 122 has written into it a short-period grating 126 along a portion of a center length of the optical fiber which has been stripped of the coating 124. Two seals 128, 129 disposed in each seal socket 114 of the cylindrical substrate 110 tensionally maintain and support the region of the optical fiber 122 containing the fiber grating 126. The seals 128, 129 may include SnO—ZnO—$P_2O_5$ glass with pyrophosphate filler or another suitable material, as described above. The substrate 110 is enclosed by a cylindrical body 130 and two end caps 132, 133 disposed substantially within the ends of the cylindrical body. The body 130 and end caps 132, 133 may include metal (such as nickel, stainless steel or Kovar®) glass, ceramic, polymer, or some other suitable material. The optical fiber 122 extends through each end cap 132, 133 and is held by plugs 134, 135. The plugs 134, 135 include solder or other suitable material as described above. The cylindrical body 130 has been crimped along the mid-span perimeter groove 116 of the substrate 110. According to another aspect of the present invention, a foam plug 180 is positioned between each end cap 132, 133 and the cylindrical body 130.

In order to compensate for the temperatures changes that the cylindrical package 120 undergoes during testing and product life, the cylindrical substrate 110 has a negative CTE, such as $-80 \times 10^{-7}$ per ° C. Thus, while the optical fiber 122 has a CTE of approximately $7 \times 10^{-7}$ per ° C., the negative CTE of the cylindrical substrate athermalizes the fiber grating 126, providing passive temperature compensation. Additionally, the cylindrical substrate 110 protects the fiber grating 126 from external perturbations (such as mechanical stress) and environmental conditions (such as moisture). While presently preferred materials are disclosed herein, one skilled in the art would appreciate that the cylindrical package 120 of the present invention may include a variety of materials and sizes, and should not be construed as limited to the embodiments shown and described herein which are exemplary.

Figure 8:
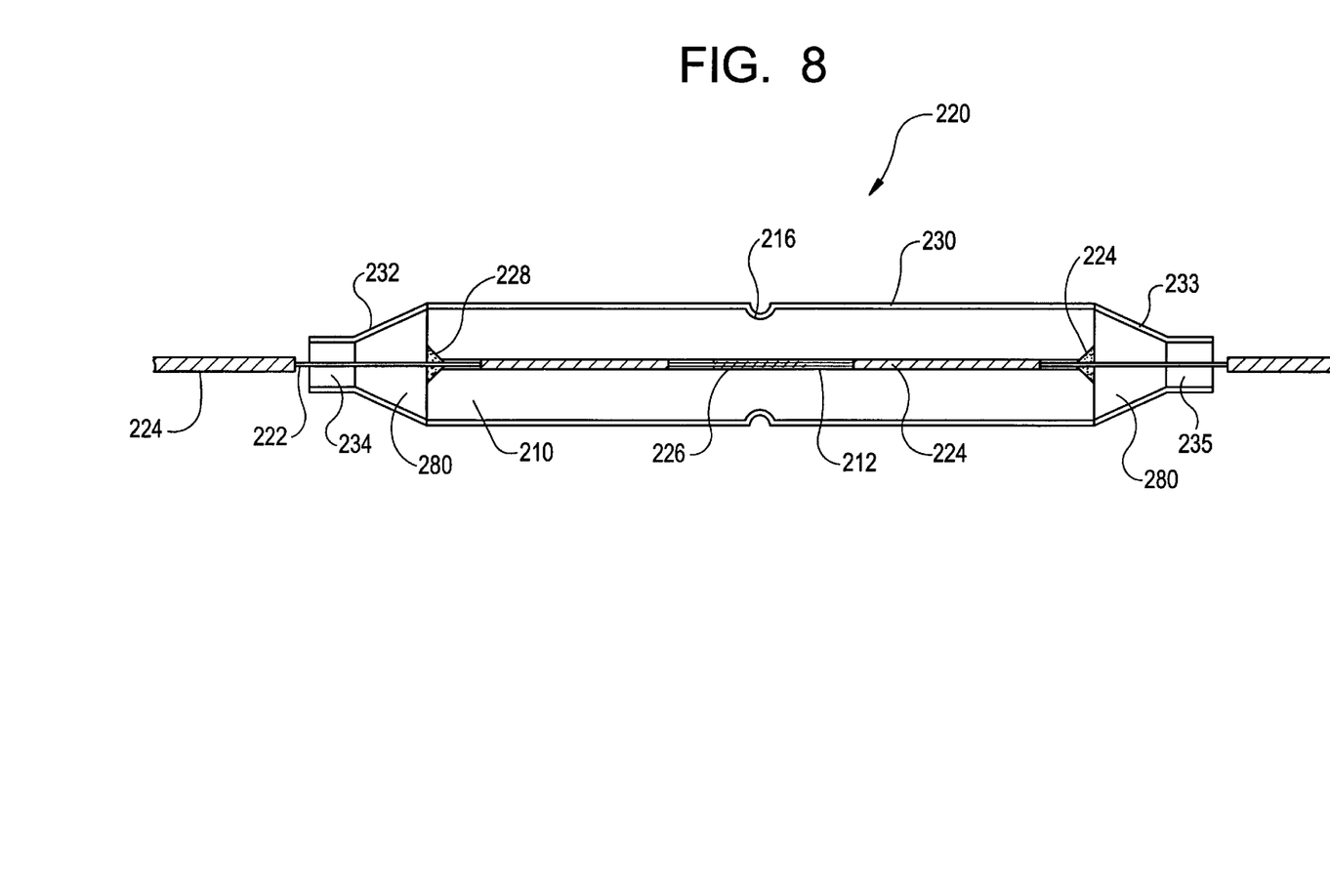
FIG. 8 is a cross-section view of an athermalized swaged cylindrical package in accordance with the present invention.

FIG. 8 shows an athermalized swaged cylindrical package 220 in accordance with another embodiment of the present invention. In the package 220, a cylindrical substrate 210 partially encloses an optical fiber 222 which includes a coating 224 which has been stripped from portions of the optical fiber 222. The optical fiber 222 has written into it a short-period grating 226 along a portion of a center length of the optical fiber which has been stripped of the coating 224. Two seals 228, 229 disposed in each seal socket 214, 215 of the cylindrical substrate 210 tensionally maintain and support the region of the optical fiber 222 containing the fiber grating 226. The seals 228, 229 may include SnO—ZnO—$P_2O_5$ glass with pyrophosphate filler or another suitable material, as described above. The substrate 210 is enclosed by a cylindrical body 230. The cylindrical body 230 has been swaged at each end to form integral end caps 232, 233. The body 230, including the integral end caps 232, 233, may include metal (such as nickel, stainless steel or Kovar®) polymer, or some other suitable material. The optical fiber 222 extends through each integral end cap 232, 233 and is held by plugs 234, 235. The plugs 234, 235, of solder or another suitable material as described above, secure the optical fiber 222 to the end caps 232. The cylindrical body 230 has been crimped along the mid-span perimeter groove 216 of the substrate 210. According to another aspect of the present invention, a foam plug 280 is positioned between each integral end cap 232, 233 and the cylindrical body 230.

In order to compensate for the temperatures changes that the cylindrical package 220 undergoes during testing and product life, the cylindrical substrate 210 has a negative CTE, such as $-80 \times 10^{-7}$ per ° C. Thus, while the optical fiber 222 has a CTE of approximately $7 \times 10^{-7}$ per ° C., the negative CTE of the cylindrical substrate athermalizes the fiber grating 226, providing passive temperature compensation. Additionally, the cylindrical substrate 110 protects the fiber grating 126 from external perturbations (such as mechanical stress) and environmental conditions (such as moisture). While presently preferred materials are disclosed herein, one skilled in the art would appreciate that the cylindrical package 220 of the present invention may include a variety of materials and sizes, and should not be construed as limited to the embodiments shown and described herein which are exemplary.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

What is claimed is:

1. A temperature compensated optical waveguide device comprising:

a tube having a first end and a second end and defining a cavity extending at least partially between said first end and said second end, said tube having a negative coefficient of thermal expansion;

an optical fiber longitudinally disposed within said cavity and having a positive coefficient of thermal expansion;

a first seal and a second seal disposed with said cavity, such that a length of said optical fiber is secured between said first seal and said second seal;

a cylindrical body having a first end and a second end, wherein the tube is longitudinally disposed within the cylindrical body;

a first end cap disposed on the first end of the cylindrical body; and a second end cap disposed on the second end of the cylindrical body, herein the optical fiber extends through a first and a second opening of the first and second end cap, respectively.

2. The temperature compensated optical waveguide device of claim 1 wherein the body is composed of nickel.

3. The temperature compensated optical waveguide device of claim 1 wherein the first end cap and the second end cap are both welded to the cylindrical body.

4. The temperature compensated optical waveguide device of claim 1 wherein:

the first end cap and the second end cap are both disposed substantially inside the cylindrical body.

5. The temperature compensated optical waveguide device of claim 1 further comprising:

a first plug disposed in the opening of the first end cap; and a second plug disposed in the opening of the second end cap.

6. The temperature compensated optical waveguide device of claim 5 wherein the first plug and the second plug are both composed of solder.

7. The temperature compensated optical waveguide device of claim 6 wherein:

the tube includes a groove circumscribing an outer surface of the tube; and the cylindrical body includes at least one crimp disposed in said groove.

8. The temperature compensated optical waveguide device of claim 7 wherein the first end cap includes a plug access hole adapted to allow placement of the first plug.

9. The temperature compensated optical waveguide device of claim 1 further comprising:

a first foam plug disposed within the first end cap; and a second foam plug disposed within the second end cap.

10. The temperature compensated optical waveguide device of claim 1 further comprising:

a clip base attached to the cylindrical body.

* * * * *